Patented Apr. 10, 1951

2,548,047

UNITED STATES PATENT OFFICE 2,548,047

RED LEAD AND METHOD OF PRODUCING SAME

Charles Herbert Olsen, Stanmore, New South Wales, Australia, assignor, by mesne assignments, to The Sherwin-Williams Company, Cleveland, Ohio, a corporation of Ohio No Drawing. Application September 21, 1949, Serial No. 117,079. In Australia September 27, 1948

2 Claims. (Cl. 260—766)

This invention relates to an improved red lead, to novel methods of producing the same and to paint products prepared from such red lead.

The object of the present invention is to provide an improved red lead in a form suitable for incorporation into paint compositions but which is capable of storage for prolonged periods without substantial caking or deterioration.

In accordance with my invention an improved red lead product, suitable for incorporation into paint compositions, is prepared by forming an aqueous dispersion of red lead and milling this with a depolymerised rubber varnish until the water is expelled therefrom and replaced by the said varnish, the milling being continued until a homogeneous product is obtained. Preferably the rubber varnish employed contains cobalt linoleate or lead linoleate as a depolymerising catalyst.

Further features of my invention will be evident from the following description of one specific method of preparing my improved product, which is given by way of example.

One hundred pounds (avoirdupois) of red lead in powder form, either of the setting or non-setting type, is mixed with one-and-a-half gallons of water to form a thick, homogeneous paste. The mixing is done in a pug mill or other heavy duty mixing machine.

To this paste while still in the mixing machine is then added gradually one-and-a-half gallons of a rubber varnish, prepared as described below. The varnish displaces the water, due to the lypophilic nature of the red lead particles, and forms a thin coating over the latter. The milling or mixing is continued until substantially all the water has been expelled and drained off, the varnish has been thoroughly incorporated with the red lead and the product is a smooth and homogeneous paste. Usually this will require approximately one hour.

To prepare the depolymerised rubber varnish fourteen pounds of crepe rubber is masticated with 0.35 pound of cobalt linoleate (containing 6-7% by weight of cobalt metal) for half an hour in a rubber mill having a roller heated until it is just warm to the touch. Alternatively half a pound of lead linoleate may be employed instead of the cobalt linoleate. It will be observed that the amount of linoleate herein employed is equivalent to about 2.5% by weight of the masticated product. This rubber product is then mixed with two gallons of a hydrocarbon solvent in a mixing machine having a tightly fitting closure until the mixture is homogeneous. The hydrocarbon solvent employed is preferably a mineral spirits having a distillation range of 130–210° C., and in an amount substantially equal in weight to the weight of the masticated product.

The red lead product is ready for immediate use, being already ground and in paste form. It is used by adding to it as required varnish, oil, pigments and other customary ingredients of paint compositions, thoroughly incorporating all together, until a paint composition of suitable brushing or spraying consistency for the intended use thereof is obtained.

The new red lead product will keep for several years in a condition ready for immediate use if it is stored in sealed containers, to prevent evaporation of solvent from the rubber varnish coating upon the red lead particles. Even if the product is kept in ordinary containers, without hermetic sealing, it will remain in good usable condition for several weeks under ordinary atmospheric conditions.

I claim:

1. An improved red lead product, suitable for immediate use by incorporation into paint compositions and which will keep in good condition for several years when stored in hermetically sealed containers comprising a smooth, homogeneous paste consisting essentially of red lead particles which are coated with a thin layer of depolymerized rubber dissolved in a hydrocarbon solvent, said product being produced by forming an aqueous dispersion of red lead in the proportion of about 100 lbs. of red lead in powder form for each 1.5 gal. of water and adding thereto depolymerized rubber produced by masticating crepe rubber with about 2.5% by weight of a linoleate selected from the group consisting of cobalt and lead linoleates and dissolving said rubber product in an approximately equal amount by weight of a hydrocarbon solvent.

2. An improved red lead product in accordance with claim 1 in which the hydrocarbon solvent is a mineral spirits having a distillation range of 130–210° C.

CHARLES HERBERT OLSEN.

REFERENCES CITED

The following references are of record in the file of this patent:

UNITED STATES PATENTS

| Number | Name | Date |
| --- | --- | --- |
| Re. 21,032 | Stubner | Mar. 21, 1939 |
| 556,793 | Williams | Mar. 24, 1896 |
| 1,312,144 | Thacher | Aug. 5, 1919 |
| 1,482,340 | Acheson | Jan. 29, 1924 |
| 1,889,429 | Wiegand | Nov. 29, 1932 |
| 2,132,809 | Stevens | Oct. 11, 1938 |
| 2,201,273 | Schoenfeld | May 21, 1940 |